(12) United States Patent
Fuller et al.

(10) Patent No.: US 6,652,012 B1
(45) Date of Patent: Nov. 25, 2003

(54) HOIST RING

(75) Inventors: Harry P. Fuller, Newbury, OH (US); James C. Klingenberg, Concord, OH (US)

(73) Assignee: Jergens, Inc., Cleveland, OH (US)

( * ) Notice: Subject to any disclaimer, the term of this patent is extended or adjusted under 35 U.S.C. 154(b) by 14 days.

(21) Appl. No.: 10/082,730

(22) Filed: Feb. 26, 2002

(51) Int. Cl.⁷ ................................................ B66C 1/66
(52) U.S. Cl. .......................... 294/1.1; 294/89; 403/79; 411/400
(58) Field of Search ............................ 294/1.1, 82.1, 294/89; 403/78, 79, 119, 164, 165, 327, 337; 59/95; 24/129 W; 411/400, 300, 354; 248/499; 410/101, 104, 111

(56) References Cited

U.S. PATENT DOCUMENTS

| | | | |
|---|---|---|---|
| 2,816,471 A | * 12/1957 | Bachman | 411/348 |
| 3,297,293 A | 1/1967 | Andrews et al. | |
| 3,371,951 A | 3/1968 | Bryant | |
| 3,492,033 A | 1/1970 | Mueller | |
| 3,628,820 A | 12/1971 | Blatt | |
| 3,760,464 A | * 9/1973 | Higuchi | 411/356 |
| 3,905,633 A | 9/1975 | Larson | |
| 4,074,519 A | 2/1978 | Garrett | |
| 4,431,352 A | 2/1984 | Andrews | |
| 4,557,513 A | 12/1985 | Ferrieri | |
| 4,558,979 A | 12/1985 | Andrews | |
| 4,570,987 A | 2/1986 | Wong et al. | |
| 4,592,686 A | 6/1986 | Andrews | |
| 4,641,986 A | 2/1987 | Tsui et al. | |
| 4,699,410 A | 10/1987 | Seidel | |
| 4,705,422 A | 11/1987 | Tsui et al. | |
| 5,125,861 A | 6/1992 | Freeman | |
| 5,183,360 A | 2/1993 | Freeman | |
| 5,248,176 A | 9/1993 | Fredriksson | |
| 5,286,130 A | 2/1994 | Mueller | |
| 5,352,056 A | 10/1994 | Chandler | |
| 5,586,801 A | 12/1996 | Sawyer et al. | |
| 5,628,600 A | * 5/1997 | Pasquini | 411/354 |
| 5,634,734 A | 6/1997 | Schron, Jr. et al. | |
| 5,743,576 A | 4/1998 | Schron, Jr. et al. | |
| 5,775,664 A | 7/1998 | Martin | |
| 5,816,732 A | * 10/1998 | Nissen | 403/78 |
| 5,848,815 A | * 12/1998 | Tsui et al. | 294/1.1 |
| D409,895 S | 5/1999 | Schron, Jr. et al. | |
| 6,022,164 A | * 2/2000 | Tsui et al. | 294/1.1 |
| 6,032,993 A | 3/2000 | Kwon | |
| 6,039,500 A | 3/2000 | Kwon | |
| 6,068,310 A | 5/2000 | Fuller et al. | |
| 6,199,925 B1 | * 3/2001 | Alba | 294/1.1 |
| 6,267,422 B1 | 7/2001 | Alba | |
| 6,293,600 B1 | 9/2001 | Lecourt | |
| 6,349,985 B1 | * 2/2002 | Aston | 294/1.1 |
| 6,443,514 B1 | * 9/2002 | Fuller et al. | 294/1.1 |

* cited by examiner

*Primary Examiner*—Dean J. Kramer
*Assistant Examiner*—Paul T. Chin
(74) *Attorney, Agent, or Firm*—Fay, Sharpe, Fagan, Minnich & McKee

(57) ABSTRACT

A hoist ring assembly for mounting on a load member includes a bolt having a circumferential recess, a support member having a bolt passage for receiving the bolt, and a pin passage transverse to and intersecting the bolt passage. A load bearing ring has legs aligned with the pin passage, and one or two pins are inserted into the pin passage so as to interengage with the recess to hold the bolt and support member against separation and to support the load ring for pivotal movement relative movement relative to the support member and for pivotal movement with the support member relative to the bolt. In one arrangement the pin passage is offset from the bolt passage and a single pin extends through the support member and engages in the recess of the bolt. In another arrangement, the pin passage opens into the recess on diametrically opposite sides thereof, and a pair of pins have inner ends received in the recess.

12 Claims, 4 Drawing Sheets

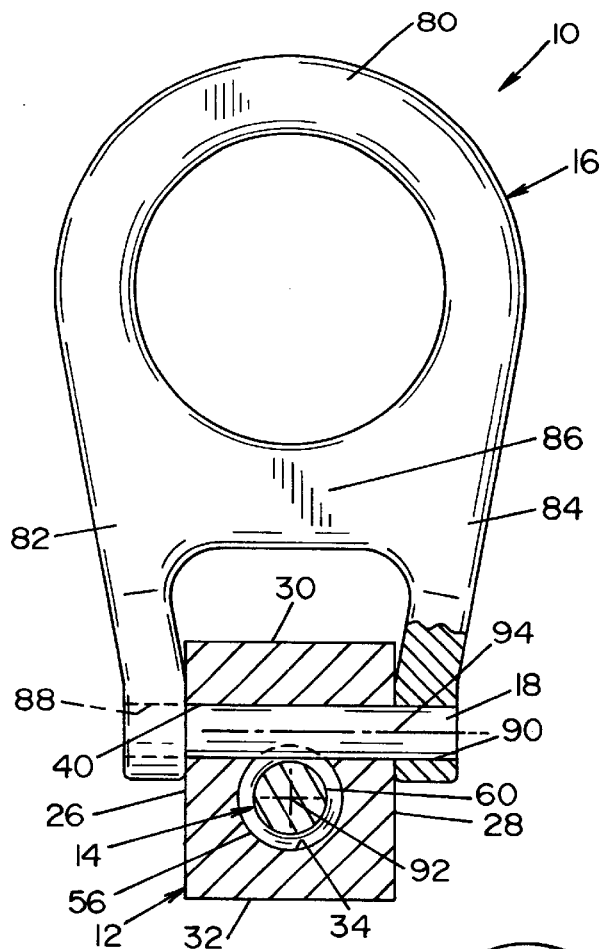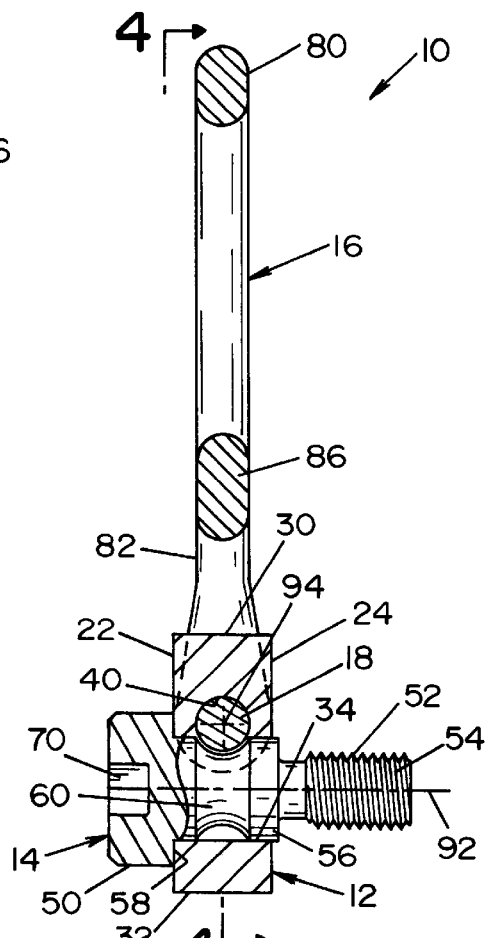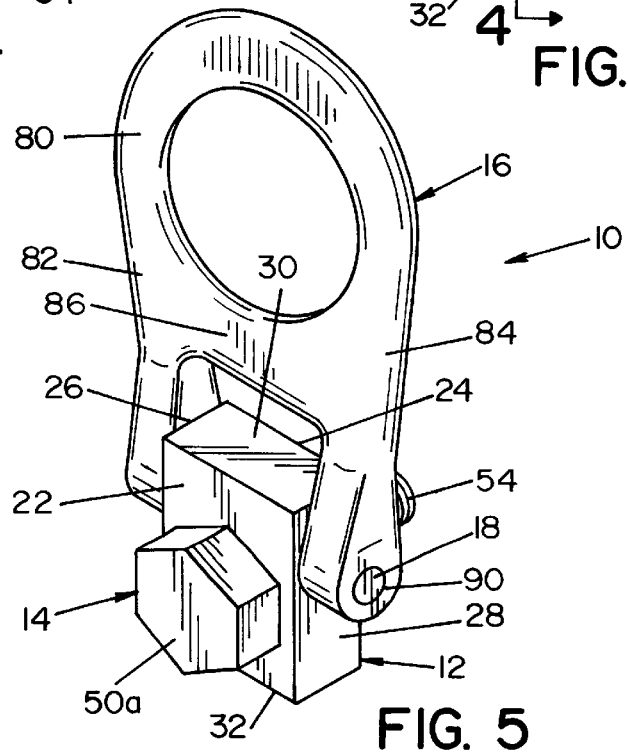

HOIST RING

The present invention relates to the art of hoist rings, which are generally used to secure a lifting device to a heavy load or object.

INCORPORATION BY REFERENCE

It is well known in the art that a hoist ring can be connected to a load member, such as a die set or mold, and then used to lift and manipulate the load member. Further, it is well known that a hoist ring attached to a load member can be used to secure the load member such as for transportation.

Fuller U.S. Pat. No. 6,068,310 is incorporated by reference herein as background information for hoist rings. Fuller discloses a side pull style hoist ring that pivotally secures a load bearing ring to a load member. Another style of hoist ring used to lift or secure a load member is disclosed in Schron U.S. Pat. No. 5,634,734 and Schron U.S. Pat. No. 5,743,576. The Schron patents disclose a center pull style hoist ring that pivotally secures a load bearing ring to a load member. As with the side pull hoist ring disclosed in Fuller, the center pull hoist ring provides rotation about two perpendicular axes, thus allowing the load bearing ring to extend pivotally toward the direction in which the load member is pulled. However, the two axes intersect, which is not true in Fuller. The Schron patents are also incorporated by reference as background information.

BACKGROUND OF THE INVENTION

It is well known in the art that by securing a load ring to an object, the load ring can be used to lift or secure the object. In this respect, a hook attached to a hoisting device may be used to lift heavy objects, such as molds and die sets. In addition, straps or tie downs can be attached to the load ring to secure a large object during shipment. Earlier load bearing rings used rigid ring mechanisms attached to the load member, the common attachment method being directly threading the load ring into a threaded bore on the surface of the load member. This design had many problems in that by directly threading the rigid load ring to the surface of the object the load ring could become loose, which would require subsequent tightening of it. In addition, the bending moment produced when the lifting device moved the load member in a direction at an angle from the axis of the threaded bore required stronger materials and additional reinforcement of the load ring.

To overcome the shortcomings of the rigid ring, hoist rings that allowed the load bearing ring to pivot toward the direction of the movement without loosening were developed. However, additional components were required in order to allow the load bearing ring to pivot into the direction of the force being applied, adding to the expense of the manufacturing process. Further, to produce a hoist ring that allowed the load bearing ring to pivot into the direction of the applied force and act as a single component in both the mounted and unmounted condition, complicated support members were required to prevent the hoist ring from becoming disassembled while allowing for pivotal movement about two axes. Further, due to the substantial forces created by using a hoist ring, high strength materials are used for the support member and typically these types of materials do not possess properties favorable for machining. This further added to the overall cost of the earlier hoist ring assemblies.

SUMMARY OF THE INVENTION

In accordance with the present invention, an improved hoist ring is provided for securing a hoisting or retaining device to a load member in which the hoist ring requires a minimum number of components while still maintaining its strength, integrity and remaining in an assembled condition, even when uninstalled from the load member. In this respect, a hoist ring according to the present invention includes a load bearing ring pivotally retained by a support member, thus allowing the load ring automatically to adjust to the direction of the applied force although the hoist ring includes a minimum number of parts. By automatically adjusting to the direction of the applied force, the structural integrity of the hoist ring is increased, and by reducing the number of components therein, the cost of the hoist ring is decreased. Further, by having components that remain in an installed condition even when the hoist ring is unmounted, the components cannot be lost.

The foregoing advantages are achieved in accordance with the present invention by a support member that includes a bolt receiving passage and a transverse pivot pin passage, which passages intersect within the support member to allow the engagement between the load ring and the support member to retain the bolt within the passage. By using a pivot pin to retain the bolt within the support member, fewer component parts are required to produce the hoist ring according to the present invention. And by using the bolt passage and pivot pin passage according to the present invention, complex machine operations are not required, thus resulting in further reductions in the cost of the hoist ring. Even further, the transverse bolt and pivot pin passages according to the present invention allow for pivotal movement of the load ring about two axes, producing automatic adjustment of the load ring in the direction of the applied force. The foregoing advantages are achieved by a pin receiving recess in the bolt that engages with a pivot pin without inhibiting the pivotal rotation about the two axes.

It is accordingly an outstanding object of the present invention to provide a hoist ring assembly that pivotally engages with a load member to allow the load bearing ring to automatically adjust to the direction of the force being applied during the lifting or securing procedure.

Another object is the provision of a hoist ring assembly of the foregoing character that requires fewer components and fewer manufacturing steps.

A further object is the provision of a hoist ring assembly of the foregoing character that is less expensive to produce while maintaining its structural integrity.

Still another object of the present invention is the provision of a hoist ring assembly of the foregoing character joined so that its components are retained therein, even when the hoist ring is removed from the load member.

Yet another object is the provision of a hoist ring assembly of the foregoing character that enables a pivot pin to engage with the bolt to maintain the bolt within the passage of the support member without inhibiting the pivotal rotation of either about the transverse axes.

BRIEF DESCRIPTION OF THE DRAWINGS

The foregoing and other objects and advantages will become apparent from the following description taken together with the accompanying drawings in which:

FIG. 3 is a sectional elevation view taken along line 3—3 in FIG. 1;

FIG. 4 is a front elevation view, partially in section, taken along line 4—4 in FIG. 3;

FIG. 5 is a pictorial view of a modification of the bolt in the embodiment of FIGS. 1–4;

DESCRIPTION OF THE PREFERRED EMBODIMENTS

Figure 1:
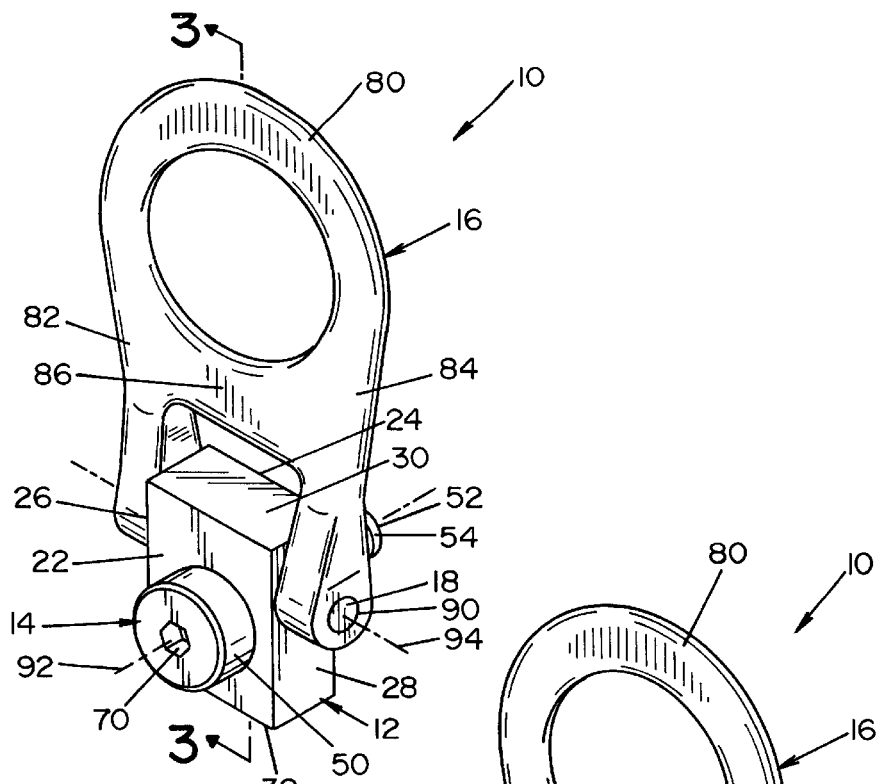
FIG. 1 is a pictorial view of a side pull hoist ring assembly in accordance with the present invention.

Reference is now made to the drawings, which are for the purpose of illustrating preferred embodiments of the present invention only and not for the purpose of limiting the same. FIGS. 1–4 show a side pull hoist ring assembly 10 according to the present invention, having a support member 12, a bolt 14, a load bearing ring 16, and a pivot pin 18. The support member 12 is shown as a rectangular block, but it should be understood that other shapes could be used. The support member 12 includes front and back surfaces 22 and 24, respectively, opposite side surfaces 26 and 28, and top and bottom surfaces 30 and 32, respectively. A passage 34 having a circular cross section with a diameter adapted to receive the bolt 14 extends between the front and back surfaces 22 and 24 of the support member 12. The support member 12 also includes a passage 40 having a circular cross section with a diameter adapted to pivotally receive the pivot pin 18 and extending between the side surfaces 26 and 28 of the support member 12. The bolt passage 34 is perpendicular to the pivot pin passage 40 and is offset therefrom such that it partially intersects with the pivot pin passage 40. As seen in FIGS. 3 and 4, this partial intersection between the two passages facilitates engagement of the pivot pin 18 with the bolt 14.

Figure 2:
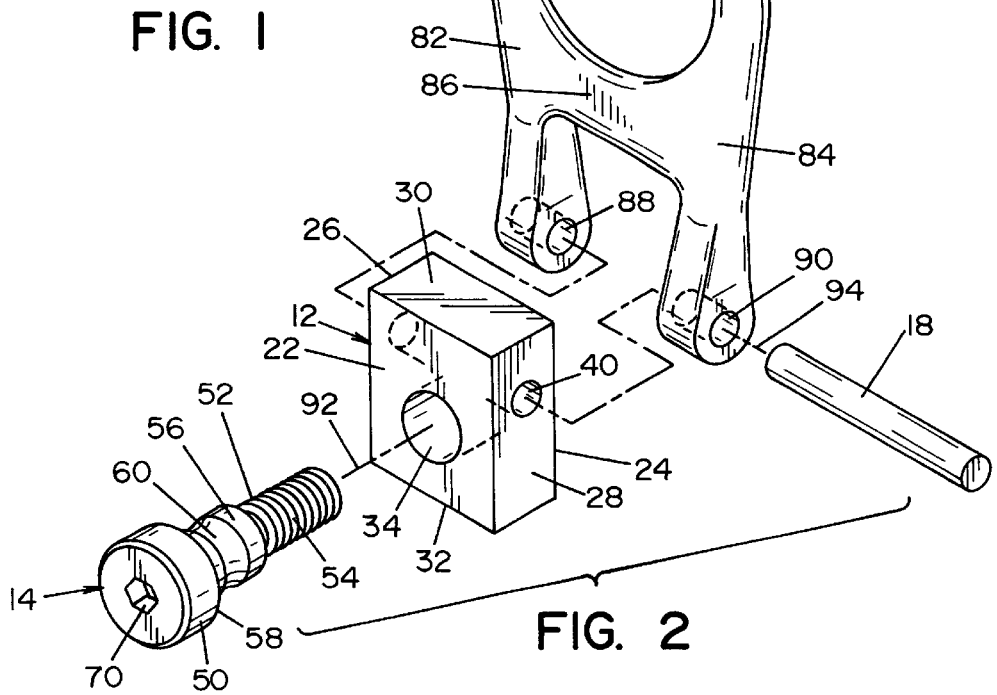
FIG. 2 is an exploded pictorial view of the hoist ring assembly illustrated in FIG. 1.
Figure 6:
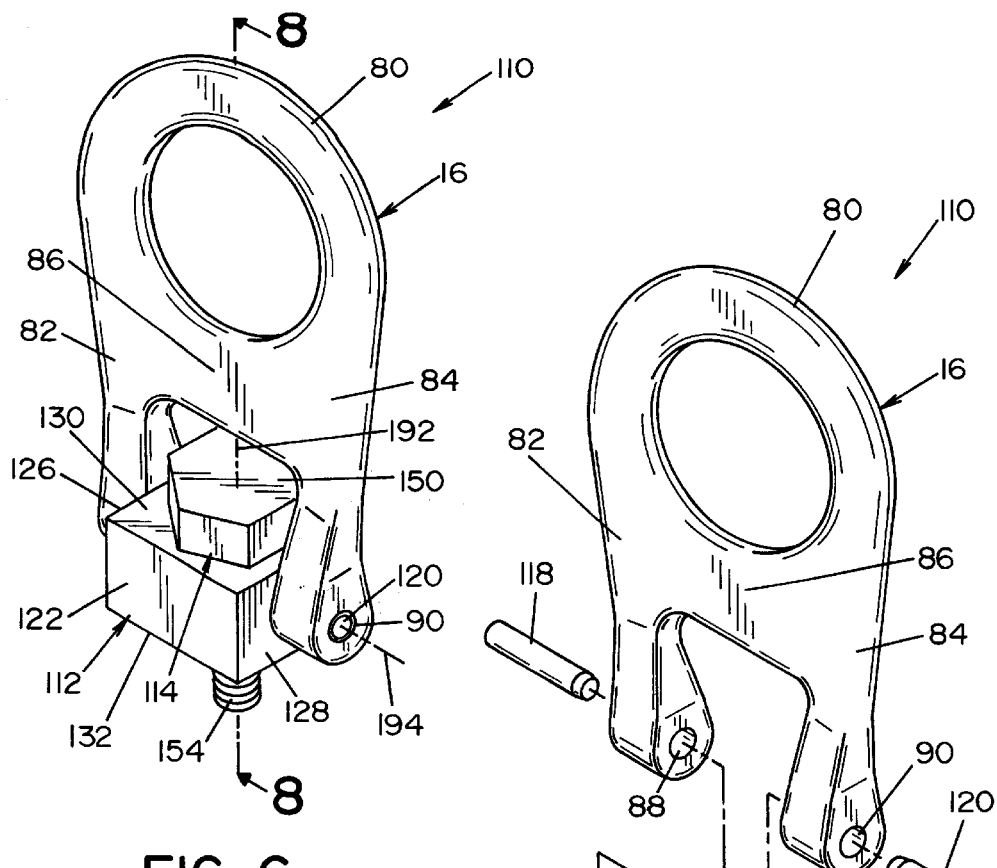
FIG. 6 is a pictorial view of a center pull hoist ring assembly in accordance with the present invention.
Figure 7:
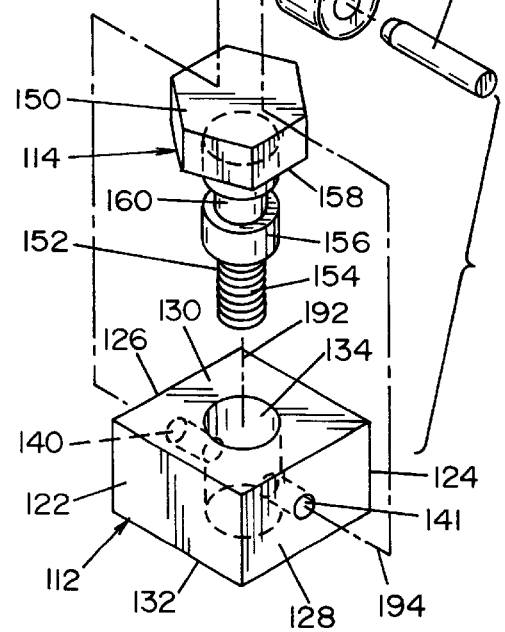
FIG. 7 is an exploded pictorial view of the hoist ring assembly illustrated in FIG. 6.
Figure 8:
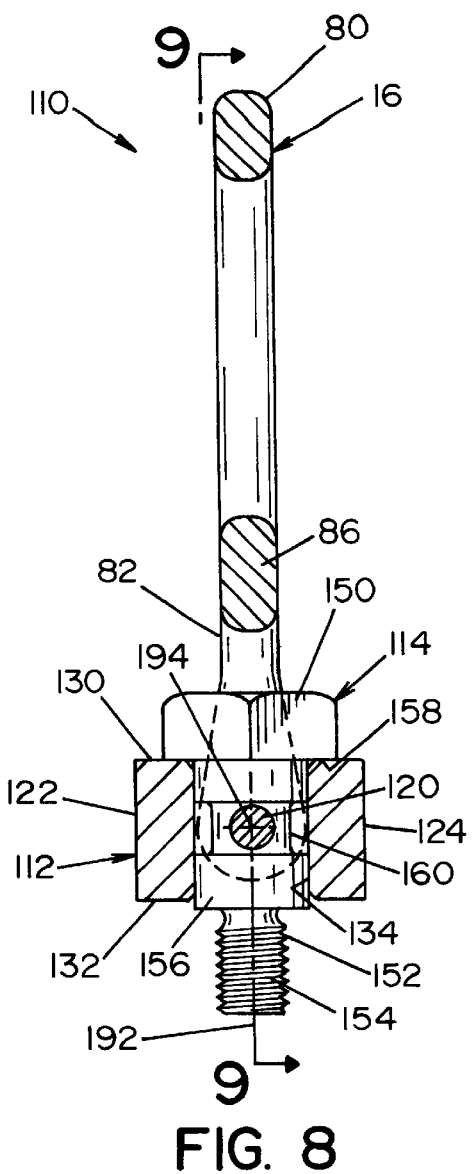
FIG. 8 is a sectional elevation view taken along line 8—8 in FIG. 6.

The bolt 14 includes a cylindrical head portion 50 and a shank portion 52, which has both a threaded portion 54 and an unthreaded portion 56. The unthreaded shank portion 56 and the head portion 50 intersect at a radial shoulder 58. As best seen in FIG. 3, the length of the unthreaded shank portion 56 is slightly greater than the width of the support member 12 between its front and back surfaces 22 and 24. Further, the unthreaded shank portion 56 has a circumferentially extending recess 60 that extends radially inward from the outer surface of shank portion 56. Recess 60 has an arcuate shape adapted, together with pin opening 40 to receive pivot pin 18. As shown in FIGS. 1 and 2, a hex socket 70 is provided in the bolt head 50 for the purpose of using a tool such as an Allen wrench to fasten the bolt 14 to a load member. However, it should be noted that other types of bolt heads could be used without departing from the present invention. For example, FIG. 5 shows a hex bolt head 50a for use with a crescent wrench or similar tool.

Load bearing ring 16 includes a generally U-shaped shackle 80 having legs 82 and 84 at the open end. Importantly, a crosspiece 86 connects the two legs of the shackle 80 such that a ring is formed above the crosspiece. In the embodiment shown in FIGS. 1–4, the shackle and crosspiece are integral with one another. However, the load bearing ring 16 could also comprise several components, such as a shackle and a crosspiece welded together. In any event, the crosspiece advantageously precludes lateral separation of the legs under a load encountered during use of the hoist ring. The legs 82 and 84 of the shackle are parallel and spaced apart such that they fit loosely alongside the side surfaces 26 and 28 of support member 12. Legs 82 and 84 include axially aligned openings 88 and 90 having diameters adapted to receive the pivot pin 18. It is important to retain pin 18 in its assembled position whereby, preferably, the diameter of one of the pivot pin openings is smaller than the other to allow for the pivot pin 18 to be press fit into the smaller opening. Alternatively, the openings could be of the same diameter and one end of the pin could be enlarged to provide for a press fit with one of the openings. Moreover, it will be appreciated that the pivot pin can be so retained other than by a press fit. For example, a pin or set screw could be provided to extend transversely into or through one or both ends of the pin at the lower ends of legs 82 and 84.

To assemble the side pull hoist ring assembly 10, the bolt 14 is inserted into the bolt passage 34, making sure that the recess 60 is aligned with the pivot pin passage 40. The pivot pin 18 is then inserted into the larger pivot pin opening and through the pivot pin passage 40. Finally, the assembly is made permanent by press fitting the pivot pin 18 into the smaller pivot pin opening, thereby retaining the load ring 16 on support member 12. In this configuration, the pivot pin 18 engages the recess 60 on the shank, which secures the bolt 14 within the bolt passage 34. Thus, while the pivot pin 18 is locked to prevent it from being inadvertently dislodged, this type of engagement permits the load ring 16 to rotate freely about the axis 94 of the pivot pin 18. Once it is assembled, the side pull hoist ring assembly 10 can be connected to a load member having a threaded bore to receive threaded portion 54 of the shank of bolt 14. This is accomplished by inserting a suitable tool into the socket 70 of the bolt 14 and applying torque. Opening 34 and unthreaded portion 56 of the bolt shank allows support member 12 and load ring 16 of hoist ring assembly 10 to pivot about axis 92 of the bolt 14, even though the bolt is secured to the load member. In addition, opening 40 and recess 60 in shank portion 56 allow pivot pin 18 to rotate relative to support member 12 and the bolt 14, thereby allowing the load ring to rotate about the axis of passage 40.

A second hoist ring assembly 110 according to the present invention is shown in FIGS. 6–9 and is a center pull hoist ring assembly. This embodiment is generally similar to the one illustrated in FIGS. 1–4 and like parts have been identified with the same reference numerals. Assembly 110 comprises a support member 112, a bolt 114, the load bearing ring 16, and two pivot pins 118 and 120. The support member 112 is shown as a rectangular block, but it should be understood that other shapes could be used. The support member 112 includes front and back surfaces 122 and 124, respectively, opposite side surfaces 126 and 128, and top and bottom surfaces 130 and 132, respectively. A passage 134 having a circular cross section with a diameter adapted to receive the bolt 114 extends between the top and bottom surfaces 130 and 132 of the support member 112. The support member 112 includes pin passages 140 and 141 having a circular cross section with a diameter adapted to receive the pivot pins 118 and 120, respectively, and which respectively extend between side surfaces 126 and 128 of the support member and bolt passage 134. The bolt passage is transverse to the pivot pin passages 140 and 141. This intersection between the two passages facilitates engagement of the bolt 114 with the pivot pins 118 and 120, as set forth more fully hereinafter.

Figure 9:
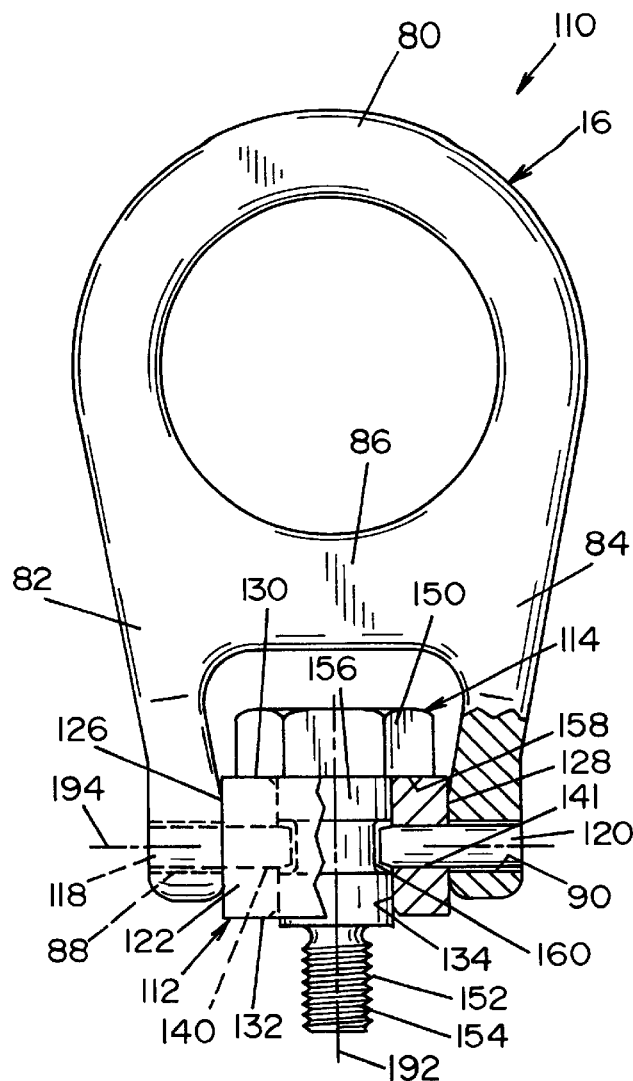
FIG. 9 is a front elevation view, partially in section, taken along line 9—9 in FIG. 8.

Bolt 114 includes a hex-shaped head portion 150 and a shank portion 152, which has a threaded portion 154 and an unthreaded portion 156. The unthreaded shank portion 156 and the head portion 150 intersect at a shoulder 158. As best seen in FIG. 9, the length of the unthreaded shank portion 156 is slightly greater than the width of support member 112 between its top and bottom surfaces 130 and 132. Further, the unthreaded shank portion 154 has a circumferentially extending recess 160 that is generally rectangular and adapted to receive the axially inner ends of pivot pins 118 and 120. In this assembly, the only modification to load bearing ring 16 is that the diameters of the pivot pin openings 88 and 90 are dimensioned for the pivot pins 118 and 120 to be press fit into the corresponding opening.

To assemble center pull hoist ring assembly 110, bolt 114 is inserted into bolt passage 134, making sure that recess 160 is aligned with pivot pin passages 140 and 141. Ring 16 is then positioned for pin openings 88 and 90 to be aligned with pin passages 141 and 140, respectively. Each of the pivot pins is then press fit into the corresponding pivot pin opening in ring 16 such that it extends through the corresponding pivot pin passage in support member 112 for the axially inner end thereof to extend into recess 160 on the shank, thus securing the bolt 114 within the bolt passage 134. It should be noted, however, that the pivot pins could also be maintained by other known methods including, but not limited to, threaded fasteners, retaining clips, locking pins, set screws, or the like. Thus, while the pivot pins 118 and 120 are locked to ring 16 to prevent them from being inadvertently dislodged, this type of engagement still permits the load ring 16 to rotate freely about the axes 194 of the pivot pins. Once it is assembled, the center pull hoist ring assembly 110 is connected to a load member by applying torque to the bolt head with a wrench or similar tool. The unthreaded shank portion 156 of bolt 114 and opening 134 in support member 112 are dimensional to allow support member 112 and load ring 116 to pivot about axis 192 of bolt 114, even though the bolt is secured to the load member. In addition, the inner ends of pivot pins 118 and 120 and recess 160 are dimensioned to allow the pin ends to move circumferentially about the bolt, thereby allowing load ring 16 to rotate about axis 194 of the pivot pins.

While considerable emphasis has been placed on preferred embodiments of the invention illustrated and described herein, it will be appreciated that other embodiments of each hoist ring assembled can be made and that many changes can be made in the disclosed embodiments without departing from the principles of the invention. Accordingly, it is to be distinctly understood that the foregoing descriptive matter is to be interpreted merely as illustrative of the invention and not as a limitation.

Having thus described the invention, it is claimed:

1. A hoist ring assembly for threaded engagement with a load member, said hoist ring assembly comprising: a bolt having a head portion, a shank portion and a bolt axis, said shank portion having a threaded portion and an unthreaded portion, said unthreaded portion having a circumferentially extending recess, a load bearing member having legs, a support member having a bolt passage for receiving and supporting said bolt, said support member having pin passage means therein having a pin passage axis, said pin passage means extending transverse to and intersecting said bolt passage, and pin means extending into said pin passage means and said recess and having outer ends each interconnected with a different one of said legs, whereby said load bearing member is pivotal relative to said support member about said pin passage axis and is pivotal with said support member about said bolt axis.

2. The hoist ring assembly as defined in claim 1, wherein said load bearing member is substantially U-shaped and has generally parallel legs, said legs having ends and a cross member interconnecting said legs at a location spaced from said ends.

3. The hoist ring assembly as defined in claim 2, wherein said support member includes a front surface, a back surface, and opposite side surfaces, said bolt passage extending between said front surface and said back surface and having a length, the length of said unthreaded shank portion being slightly greater than the length of said bolt passage, and said pin passage means extending between said side surfaces.

4. The hoist ring assembly as defined in claim 3, wherein said pin means comprises a cylindrical pivot pin and said pin passage means is adapted to receive said pivot pin.

5. The hoist ring assembly as defined in claim 2, wherein said support member includes a top surface, a bottom surface, and opposite side surfaces; said bolt passage extending between said top surface and said bottom surface and having a length, the length of said unthreaded shank portion being slightly greater than the length of said bolt passage, and said pin passage means extending between said side surfaces.

6. The hoist ring assembly as defined in claim 5, wherein said pin means comprises two diametrically opposed cylindrical pivot pins, and said pin passage means is adapted to receive said pivot pins.

7. A hoist ring assembly for threaded engagement with a load member, said hoist ring assembly comprising: a bolt having a head portion, a shank portion and a bolt axis, said shank portion having a threaded portion and an unthreaded portion, said unthreaded portion having a circumferentially extending recess, a load bearing member having generally parallel legs and means for interconnecting said legs, a support member having a front surface, a back surface, opposite side surfaces, a bolt passage for receiving and supporting said bolt, and pin passage means, said bolt passage extending between said front surface and said back surface and having a length, the length of said unthreaded shank portion being slightly greater than the length of said bolt passage, said pin passage means extending between said side surfaces and being transverse to and intersecting said bolt passage, pin means extending into said pin passage means and said recess and having a pin axis and outer ends each interconnected with a different one of said legs, whereby said load bearing member is pivotal relative to said support member about said pin axis and is pivotal with said support member about said bolt axis.

8. The hoist ring assembly as defined in claim 7, wherein said load bearing member is substantially U-shaped, said legs have ends, and said interconnecting means comprises a cross member interconnecting said legs at a location spaced from said ends.

9. The hoist ring assembly as defined in claim 8, wherein said pin means comprises a cylindrical pivot pin and said pin passage means is adapted to receive said pivot pin.

10. A hoist ring assembly for threaded engagement with a load member, said hoist ring assembly comprising: a bolt having a head portion, a shank portion and a bolt axis, said shank portion having a threaded portion and an unthreaded portion, said unthreaded portion having a circumferentially extending recess, a load bearing member having generally parallel legs and means for interconnecting said legs, a support member having a top surface, a bottom surface, opposite side surfaces, a bolt passage for receiving and supporting said bolt, and pin passage means, said bolt passage extending between said top surface and said bottom surface and having a length; the length of said unthreaded shank portion being slightly greater than the length of said bolt passage; said pin passage means extending between said side surfaces, said pin passage means extending transverse to and intersecting said bolt passage, and pin means extending into said pin passage means and said recess and having a pin axis and outer ends each interconnected with a different one of said legs, whereby said load bearing member is pivotal relative to said support member about said pin passage axis and is pivotal with said support member about said bolt.

11. The hoist ring assembly as defined in claim 10, wherein said load bearing member is substantially U-shaped, said legs have ends, and said interconnecting means comprises a cross member interconnecting said legs at a location spaced from said ends.

12. The hoist ring assembly as defined in claim 11, wherein said pin means comprises two diametrically opposed cylindrical pivot pins, and said pin passage means is adapted to receive said pivot pins.

* * * * *